Jan. 5, 1926.

G. WATSON 1,568,199

CUTTER MOUNTING

Filed May 16, 1925

Witnesses:
N.B. Peckham
Wm H. Drake

Inventor:
Guy Watson
by

Patented Jan. 5, 1926.

1,568,199

UNITED STATES PATENT OFFICE.

GUY WATSON, OF CANASTOTA, NEW YORK.

CUTTER MOUNTING.

Application filed May 16, 1925. Serial No. 30,701.

*To all whom it may concern:*

Be it known that I, GUY WATSON, a citizen of the United States, residing at Canastota, in the county of Madison and State of New York, have invented certain new and useful Improvements in Cutter Mountings, of which the following is a specification.

The object of the present invention is to provide novel, convenient and effective means for mounting a rotary saw blade or other cutting implement of an analogous character, so that its pitch or angularity to its axis of rotation may be changed to various degrees from a plane perpendicular to such axis in order that grooves and the like of various widths can be cut without the necessity of substituting saws.

The preferred embodiment of the invention is illustrated in the accompanying drawings, wherein:—

Figure 1:
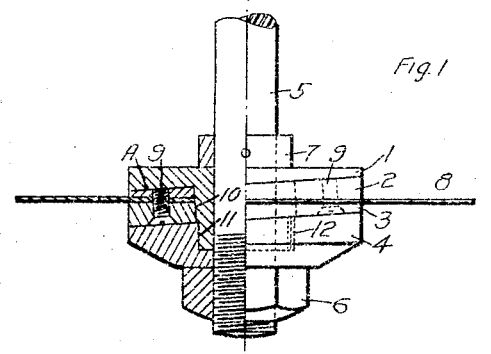
Figure 2:
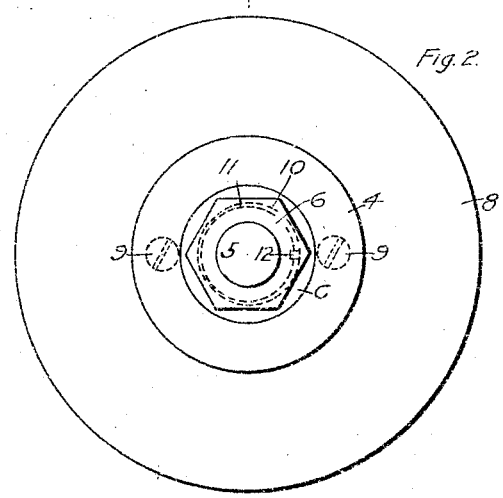
Figure 3:
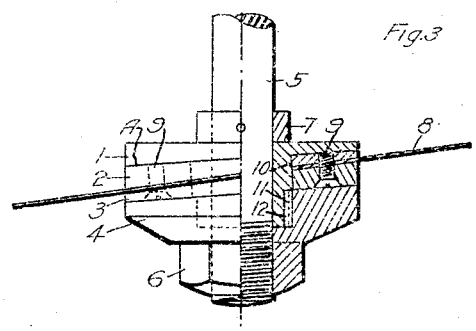

Figure 1 is a view partly in plan and partly in section, showing the novel mounting, Figure 2 is an end elevation of the same, Figure 3 is a view similar to Figure 1, but showing the saw in a different adjusted relation or position with respect to the shaft.

In the embodiment disclosed, a shaft, mandrel or arbor 5 is provided, on which is mounted a collar 7, forming an abutment flange. Against this flange is located the rear side of a clamping head 1, having an inner face A that is at an inclination to a plane perpendicular to the axis of rotation of the shaft 5. Projecting from this head 1, and surrounding the shaft 5, is a hub, comprising an inner portion 10 that is located perpendicular to the face A and therefore at an inclination to the shaft 5 which it surrounds. At the outer end of this portion 10 and integral therewith is another portion 11, said portion 11 having its axis coincident with the axis of the shaft 5.

Rotatably mounted on the portion 10 of the hub are saw-holding disks 2 and 3, the outer faces of these disks being parallel to the face A of the head 1, and the inner faces being inclined with respect to said outer faces. Between these disks 2 and 3 the saw or other cutting member, designated 8, is located, and said saw and disks are held together by screws or other fasteners 9.

Slidably mounted on the outer end portion 11 of the hub is a clamping head 4, whose inner face is parallel with the face A of the head 1, and thus bears flat against the outer face of the adjacent saw-holding disk 3. The head 4 is preferably held against rotation on the hub, as for instance, by means of a feather or key 12. The outer end of the head 4 closely surrounds the outer end of the shaft 5, and on said end of said shaft is threaded a clamping nut 6 that bears against the head 4.

With this construction, it will be evident that if the nut 6 is loosened, the disks 2 and 3 and the saw or cutter 8 carried thereby can be freely rotated on the portion 10 of the hub, and when so rotated the saw or cutter 8 can be placed in various relations between a location perpendicular to the axis of the shaft 5, as illustrated in Figure 1 and a relatively great inclination to said axis, as illustrated in Figure 3. The saw or cutter 8 can thus be made to make a narrow cut, or will have a wabbling action to produce a wide kerf or groove. It will only be necessary to tighten the nut 6 when the desired position has been obtained, thereby forcing the clamping head 4 to coact with the clamping head 1, and securing the saw against relative rotation with respect to the shaft.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. A circular saw or cutter mounting applicable as an entity to a shaft and comprising a body having a clamping head at one end and a hub projecting from the head, said head and hub having a bore for the reception of a shaft, a second head slidably mounted on the hub and coacting with the clamping head, said heads having opposing faces that are inclined to a plane perpendicular to the axis of the bore, and saw holding elements rotatably mounted on the hub between the heads.

2. A circular saw or cutter mounting applicable as an entity to a shaft and comprising a body having a clamping head at one end and a hub projecting from the head, said head and hub having a bore for the reception of a shaft, a second head slidably mounted on the hub and coacting with the clamping head, said heads having opposing faces that are inclined to a plane perpendicular to the axis of the bore, and saw holding elements rotatably mounted on the hub between the heads, and having substantially parallel outer faces and inner opposed saw engaging faces that are inclined to the outer faces.

3. A circular saw or cutter mounting comprising a clamping head, a hub extending therefrom, said head and hub having a bore for the reception of a shaft, a second clamping head coacting with the first head, said heads having their inner faces inclined to a plane perpendicular to the axis of the shaft-receiving bore, the hub having an exterior surface that is perpendicular to the opposed inner faces of the clamping heads, and saw holding disks on said inclined portion of the hub member between the clamping heads.

4. A circular saw or cutter mounting comprising a shaft, a clamping head mounted on the shaft and having a hub with a portion inclined to the axis of the shaft and a portion axial to said axis, saw holding disks rotatably mounted on the inclined portion of the hub, and a clamping head adjustably mounted on the other portion of the hub and coacting with the first head to clamp the saw holding disks between them.

5. In a circular saw or cutter mounting comprising a shaft, a clamping head mounted on the shaft and having a hub with a portion inclined to the axis of the shaft, and an outer end portion axial to said axis, the inner face of said clamping head being on a plane substantially perpendicular to the axis of the inclined portion of the hub, saw holding disks rotatably mounted on the inclined portion of the hub and having outer faces substantially parallel and inner saw engaging faces inclined to the outer faces, a second clamping head slidably and non-rotatably mounted on the said outer end of the hub and having an inner disk engaging face substantially parallel to the opposing inner face of the first clamping head, and means for moving the second clamping head toward the first clamping head and holding it.

In testimony whereof, I affix my signature.

GUY WATSON.